Nov. 7, 1967     W. E. WARNER     3,351,305
AIRBORNE DISTRIBUTION SYSTEM AND RETRACTION APPARATUS THEREFOR
Filed March 2, 1965     2 Sheets-Sheet 1
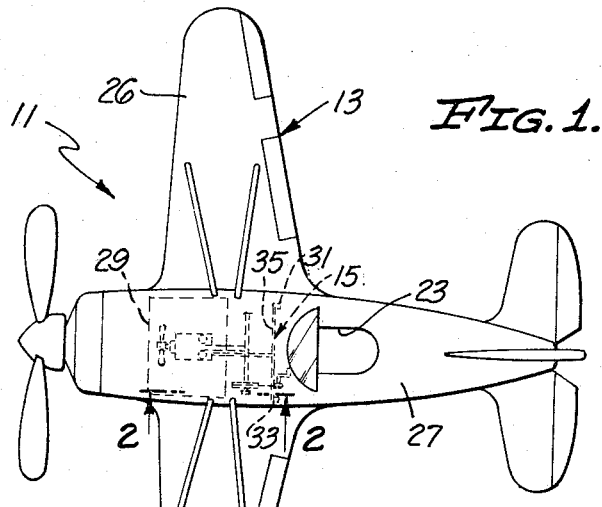
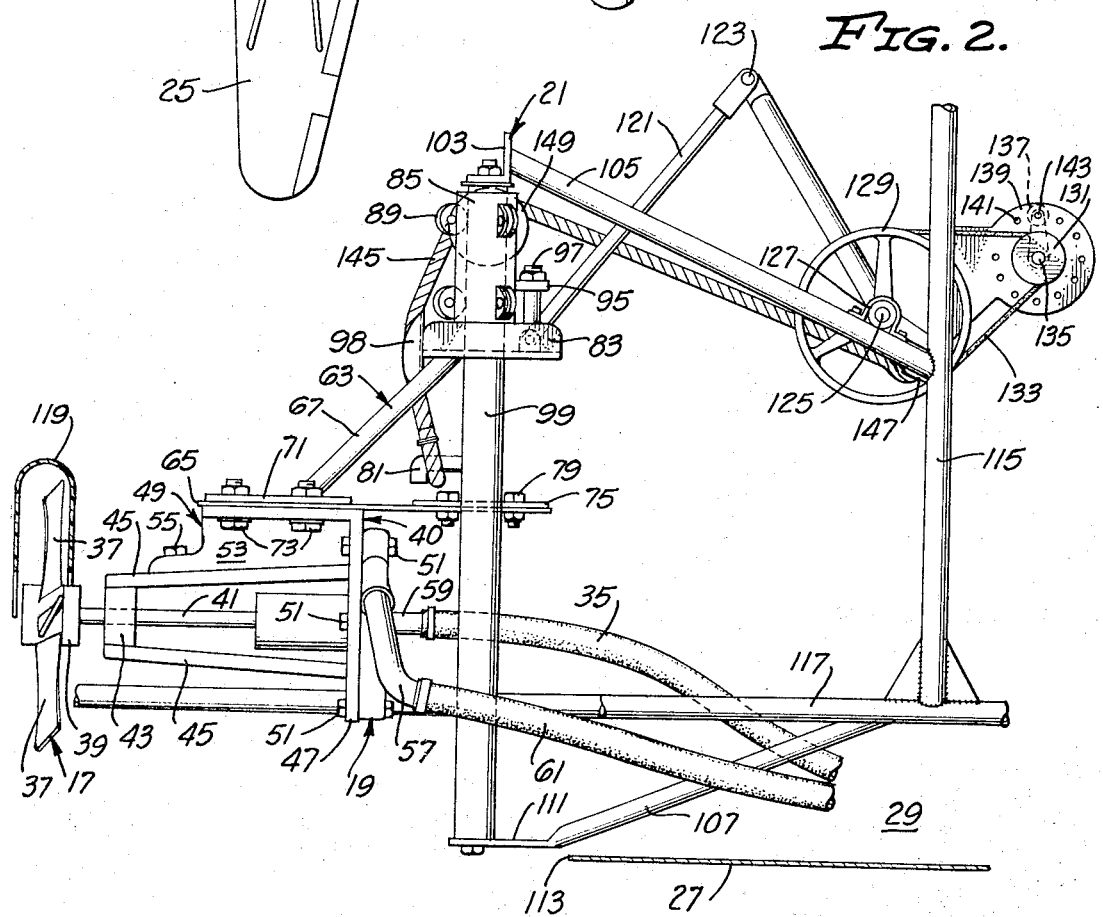
INVENTOR.
WAYNE E. WARNER
BY HIS ATTORNEYS
HARRIS, KIECH, RUSSELL & KERN

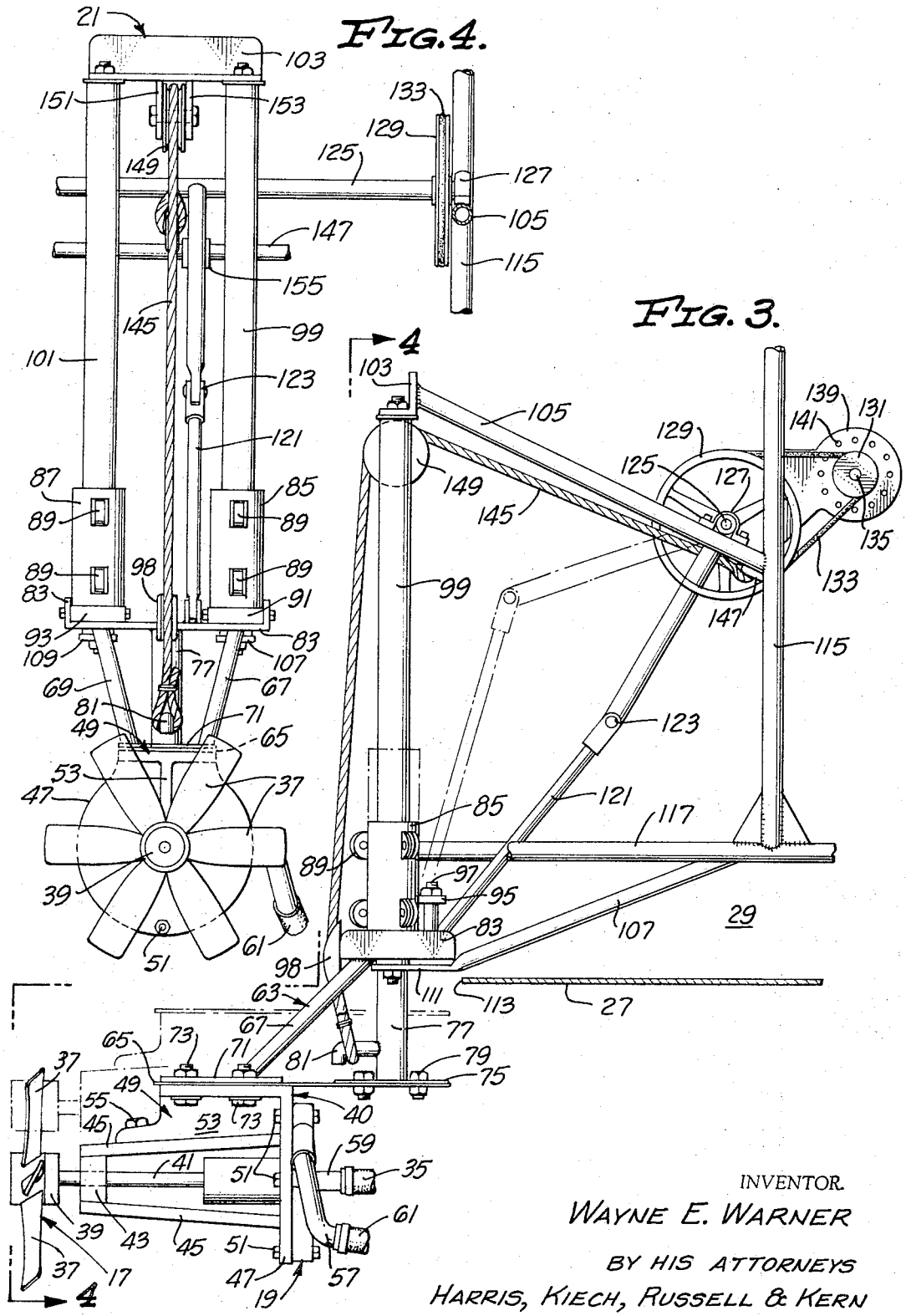

United States Patent Office 3,351,305
Patented Nov. 7, 1967

3,351,305
AIRBORNE DISTRIBUTION SYSTEM AND
RETRACTION APPARATUS THEREFOR
Wayne E. Warner, 820 E. Orange,
Santa Maria, Calif. 93454
Filed Mar. 2, 1965, Ser. No. 436,496
16 Claims. (Cl. 244—136)

This invention relates to an airborne distribution system and to a retraction device therefor.

A conventional crop dusting and/or spraying apparatus includes a relatively small light airplane, a dispersion apparatus such as spray bars and nozzles, and a pump for pumping the spray or dust through the dispersion apparatus. The pump may be driven by a wind-driven fan, both of which are mounted on the lower portion of the airplane and depend therefrom into the airstream. The drag caused by the fan and pump on the heavily loaded small plane is significant and considerably reduces the speed and efficiency thereof. Thus, when the dispersion apparatus is not in use, the speed and efficiency of the airplane are unnecessarily reduced.

To control the pumping pressures and output of the pump, it is common practice to vary the pitch of the fan blades. Absent a very elaborate and expensive system not usually found and not feasible for use in airborne distribution devices, this adjustment cannot be accomplished during flight and must be accomplished on the ground. Thus, if the pitch is set incorrectly, or different fields requiring different quantities of spray or dust are to be sprayed, or other factors requiring variation in fan speed are present, the plane must be landed before the adjustment can be made. This procedure is costly in terms of time and money and also is a substantial source of inconvenience for the pilot.

Other devices such as a fan brake for controlling pump output or a valve to bleed spray back to the reservoir are also unsatisfactory because the fan is fully subjected to the airstream at all times thereby producing significant drag and reducing airplane efficiency.

Accordingly, it is an object of this invention to increase the efficiency of the airplane of an airborne distribution system.

Another object of this invention is to reduce the drag and increase the speed of an airplane which is utilized in an airborne distribution system.

Another object of this invention is to carry the wind-driven fan and pump for an airborne distribution system within a well in the fuselage of an airplane and to lower them into the airstream only during the spraying operation.

A further object of this invention is to control the pumping pressure and output of the pump during flight by varying the exposure of the wind-driven fan to the airstream. More particularly, the exposure of the fan to the airstream may be varied by lowering the fan partially out of the well and partially into the airstream. Thus, the fan protrudes into the airstream only to the extent necessary to develop the required pumping pressures and no unnecessary drag is produced and no energy is wasted.

Another object of this invention is to provide a safety enclosure for the fan while the fan is within the well of the airplane.

Another object of this invention is to provide a simple mechanism which is easy to construct for lowering the fan and pump of an airborne distribution system into the airstream and for retracting and partially retracting them back into the well when the distribution system is not in use. Such means includes a support within the well and secured to the airplane and slide means secured to the support and extending downwardly toward the open end of the well and toward the airstream. Follower means are slidably secured to the slide at one end and to the wind-driven fan and pump at the other end. Means for moving the follower means in both directions along the slide are provided to lower the fan and pump into the airstream and to retract the fan and pump from the airstream into the well.

Another object of this invention is to provide a retracting device having locking means operative when the follower means is in or closely adjacent its lowermost position for preventing upward forces such as forces of acceleration exerted on the follower means from moving same a substantial distance upward relative to the slide means. This may be accomplished by utilizing a jointed arm pivotally connected at one end to the support and at the other end to the follower means, the jointed arm engaging an abutment in or closely adjacent the lowermost position.

A further object of this invention is to provide a retracting device for a pump and fan in which only a small amount of power is required to lower and retract the pump and fan. This may be accomplished by providing means such as an elastic cord for urging the follower means upwardly along the slide means.

The invention, both as to its organization and method of operation, together with further objects and advantages thereof, may best be understood by reference to the following description taken in connection with the accompanying drawings.

In the drawings:

FIG. 1 is a plan view of an airborne system for distributing flowable material embodying the concepts of this invention;

FIG. 2 is an enlarged side elevational view partially in section taken along line 2—2 of FIG. 1 and showing the fan and pump held in a fully retracted position by a lowering and retraction device;

FIG. 3 is a side elevational view similar to FIG. 2 showing the fan and pump in the lowermost position; and FIG. 4 is an end elevational view taken along line 4—4 in FIG. 3.

Referring to FIGS. 1 and 2 of the drawings, an airborne distribution system 11 includes an airplane 13, a dispersion apparatus 15, a wind-driven fan or motor means 17, a pump or pressurizing means 19, and a lowering and retraction device 21. The airplane 13 includes a cockpit 23, a pair of wings 25 and 26 and a fuselage 27 having a well 29 positioned between the wings and opening downwardly. Any airplane which is suitable for crop spraying or dusting duty and which is capable of providing the well 29 of appropriate size may be utilized in this invention.

The dispersion apparatus 15 is attached to the underside of the airplane 13 and may include a pair of spray bars or nozzles 31 and 33, and suitable flexible conduit means 35 connecting the spray bars with the pump 19. In the specific embodiment illustrated, the spray bars 31 and 33 are secured to the lower or underside of the fuselage 27; however, various types and arrangements of spray bars may be utilized in this invention. The spray bars 31 and 33 receive a flowable material which may be either dust or spray from the pump and conduit means 35 and assist in distributing it over the field or other area which is being sprayed.

The fan 17 incluldes a plurality of variable pitch blades 37 extending radially outwardly from a hub 39 which is mounted on a drive shaft 41, the latter being drivingly connected to the pump 19. The pitch of the fan blades 37 is selected so that when the fan is exposed to a moving air stream, the air stream will cause rotation of the fan, thereby providing a wind-driven motor means for the pump 19. The fan 17 may include a brake (not shown) for preventing rotation thereof even when subjected to a moving air stream.

Bracket means 40 for mounting the fan and pump are provided. Thus, the drive shaft 41 is supported adjacent one end by a bearing 43 which is rigidly secured by a plurality of ribs 45 to a circular flange 47 of a generally T-shaped supporting member 49 (FIG. 4). The pump 19 is secured to the circular flange 47 by a plurailty of bolts 51 and a web 53 of the generally T-shaped member 49 is secured by a bolt 55 to the uppermost rib 45.

The pump 19 is a centrifugal pump and includes an inlet 57 and an outlet 59, the inlet being connected to a flexible conduit 61 leading to a storage container (not shown) and the outlet being connected to the flexible conduit means 35 leading to the spray bars 31 and 33. The storage container may contain any flowable material either dust or spray which is to be distributed by the airborne distribution system 11.

The lowering and retraction device 21 is provided to impart movement to the fan 17 and the pump 19. The lowering and retraction device 21 includes follower means 63 which is secured to the bracket means to impart movement thereto. The follower means 63 includes a plate member 65 and two diagonal struts 67 and 69 welded to a web 71, the web, the plate member, and the generally T-shaped supporting member 49 being connected together by a plurality of bolts 73. The plate member 65 extends rearwardly of the circular flange 47 and is secured to a flange 75 of a generally vertically extending post 77 (FIG. 3) by a plurality of bolts 79. The post 77 which is provided with a generally downwardly facing hook 81 extends upwardly and is secured to a generally channel-shaped base member 83. As seen in FIG. 4, the diagonal struts 67 and 69 diverge as they extend upwardly and are welded to the underside of the channel-shaped base member 83.

Two sleeves or collars 85 and 87 having suitable bearings 89 are rigidly secured to and extend generally vertically upwardly from the base member 83 is spaced parallel relationship. The lower sections of the sleeves 85 and 87 may be provided with outwardly extending feet 91 and 93 (FIG. 4) which are welded to the base member 83. A flange 95 (FIGS. 2 and 3) may be provided on each of the sleeves 85 and 87 to receive a bolt 97 for assuring a strong connection to the base member 83. A narrow channel-shaped cord guide 98 is secured to the forward edge of the base member 83 and extends generally vertically.

Slide means are provided to guide the generally vertical movement of the follower means 63. The slide means includes two spaced generally parallel substantially vertical slide rods or tubes 99 and 101 on which the sleeves 85 and 87, respectively, are mounted for movement. The straight parallel rods 99 and 101 are preferred; however, rods of other shape and orientations may be employed. The base member 83 has two apertures (not shown), one aligned with each of the sleeves 85 and 87 to receive the rods 99 and 101.

Supporting means for supporting the two rods 99 and 101 is provided and includes a cross arm 103 which may be angle iron bolted to the tops of each of the rods and welded to a plurality of rearwardly extending upper braces 105. The lower ends of the rods 99 and 101 are bolted to rearwardly extending lower braces 107 and 109, respectively. The lower brace 107 has a flattened portion 111 and the lower brace 109 has a similar flattened portion (not shown) which serve as a stop for the base 83 to prevent downward movement thereof below the position shown in FIG. 3.

The lowering and retraction apparatus 21, the fan 17, and the pump 19 are carried within the well 29 of the airplane 13. As shown in FIG. 2, the well 29 forms an opening 113 in the underside of the fuselage 27. The airplane 13 includes a vertical frame member 115 in the well 29 to which the braces 105 are welded and a horizontal frame member 117 to which the lower brace 107 is welded. The lower brace 109 may be similarly welded to a suitable frame member within the well 29. Thus, in the fully retracted position illustrated in FIG. 2, the fan 17 and the pump 19 are completely within the well 29 and are not exposed to the air stream beneath the fuselage 27. The generally vertical slide rods 99 and 101 are supported within the well and extend downwardly toward the opening 113 of the well 29 and the air stream therebelow. Although, in the fully retracted position indicated, all portions of the fan 17, the pump 19, and the retraction device 21 are shown as completely within the well 29, it should be understood that small portions of any of these members may project slightly through the opening 113 into the air stream. However, in order to produce only negligible drag, the fan 17, the pump 19, and the retraction device 21 should be substantially completely within the well 29. Although a cover or a hatch (not shown) may be provided to close the opening 113, it is preferred, for simplicity and weight reduction, to allow the opening 113 to remain open.

A hollow fan housing 119 of fiber glass or other strong light-weight material is secured to the airplane within the well 29 immediately above the fan 17 and forms a safety enclosure therefor. The fan housing 119 forms an inverted U in cross section and has an open lower end to allow the fan 17 to move downwardly therefrom. The fan housing receives the fan 17 in the fully and several partially retracted positions so that if the fan "throws" one of the blades 37 upwardly during operation thereof, the fan housing will absorb the impact and prevent damage to the airplane 13.

Means are provided for moving the follower means in both directions along the slide rods 99 and 101 to thereby cause movement of the fan 17 and the pump 19 into and out of the well 29. Such means includes a jointed arm 121 having a joint 123 intermediate the ends thereof pivotally connected at one end to the base 83 and rigidly connected at the other end to a rotatably mounted control shaft 125. The pivotal axes of the joint 123, the control shaft 125, and the connection between the base member 83 and the jointed arm 121 are all preferably substantially parallel. The control shaft 125 which is rotatably secured to the braces 105 by a bearing 127 has a relatively large diameter pulley 129 rigidly secured to one end thereof. A small diameter pulley 131 is drivingly connected to the large diameter pulley 129 by a belt 133, the small diameter pulley being mounted on and for rotation with an actuator shaft 135. The actuator shaft 135 may be rotated by a crank 137 positioned in the cockpit 23 of the airplane 13. To lock the crank 137 in the desired angular position, a plate 139 having a plurality of apertures 141 is rigidly secured adjacent the crank and the crank is provided with a spring-loaded pin 143 which is receivable in any one of the apertures 141. Thus, when the pin 143 is received in one of the apertures 141, the crank is rigidly locked in position. No particular supporting means is illustrated for the actuator shaft 135 or the plate 139 as any suitable means may be provided. Thus, rotation of the crank 137 within the cockpit 23 causes the fan 17 and the pump 19 to be lowered or retracted.

Because the fan 17 and pump 19 are quite heavy, it is desirable to provide means for biasing or urging the follower means 63 upwardly along the slide rods 99 and 101, thereby facilitating lowering and retraction thereof. Such means includes a strong elastic cord 145 connected at one end to the hook 81 of the follower means and at the other end to a frame member 147 within the well 29. The elastic cord 145 slides in the cord guide 98 and passes over a pulley 149 which is rotatably mounted on a pair of spaced parallel tabs 151 and 153 secured to the underside of the cross arm 103. The cord 145 urges the follower means 63, the fan 17, and the pump 19 upwardly, thereby reducing the effective weight thereof.

The fan 17 and the pump 19 are normally retained in the fully retracted position shown in FIG. 2 so that drag is reduced and efficiency of the airplane 13 is increased. When, during flight, it is desired to expose the fan 17 to the airstream immediately beneath the opening 113, the crank 137 is rotated counterclockwise to pivot the jointed arm 121 to the lowermost position shown in FIGS. 3 and 4. This rotation causes the jointed arm 121 to urge the follower means 63 and, hence, the fan 17 and the pump 19 downwardly along the slide rods 99 and 101 against the upward biasing force of the elastic cord 145. In the lowermost position shown in FIG. 4, the fan 17 is given a maximum exposure to the air stream to cause maximum rotation thereof and, hence, maximum output from the pump 19 results. Downward movement beyond the lowermost position of FIGS. 3 and 4 is prevented by the flattened portion 111 of the lower brace 107 and the corresponding flattened portion on the lower brace 109, the base 83 seating on such flattened portions in the lowermost position.

In crop spraying or dusting, it is frequently necessary or desirable to cause the airplane to maneuver sharply thereby placing considerable upward or downward G-forces on the components of the distribution system. That is, during a period of rapid descent of the airplane 13, the fan 17, the pump 19, and the follower means 63 may be urged upwardly. In the lowermost position, the elastic cord 145 also exerts maximum upward force on the follower means 63. If such upward movement were allowed, when the period of rapid descent ended the follower means 63 would slide downwardly along the rods 99 and 101 and severely impact on the flattened portions 111.

The jointed arm 121 acts as a locking means which is operative when the follower means is in or closely adjacent its lowermost position to prevent upward forces exerted on the follower means from moving same a substantial distance upward relative to the slide rods. As shown in FIG. 3, in the lowermost position the joint 123 is over-center, i.e., it lies to the right of a straight line drawn between the connections at the ends of the jointed arm. Thus, upward forces caused by acceleration and the elastic cord 145 exerted on the follower means 63 will tend to move the joint 123 farther toward the right. Such movement of the joint 123 is prevented, however, by a suitable abutment 155 (FIG. 4) formed on the frame member 147 which engages the upper portion of the jointed arm 121 in the lowermost position. Thus, when the elastic cord 145 exerts its maximum upward force, the follower means 63 is locked against upward movement. If desired, a locking apparatus (not shown) may be provided to lock the components in the position shown in FIG. 2.

A very important feature of the lowering and retraction device 21 is its ability to vary the exposure of the wind-driven fan 17 to the airstream to thereby vary the output of the pump 19 while the airplane is in flight. That is, when a lesser percentage of the fan 17 is exposed to the airstream, it will turn at a slower rate to thereby turn the pump at a slower rate to reduce the output thereof. If the fan 17 and the pump 19 were allowed to remain in the lowermost position, and the pump output were reduced as required by varying the pitch of the fan blades, braking the fan, or adjusting valves on the output 59 of the pump, the airplane 13 would feel the full drag effects of the fan and pump and efficiency would be reduced accordingly. However, when the lowering and retraction device 21 of the present invention is used, the fan 17 is inserted into the airstream only to the extent necessary to develop the required pumping pressures. Because drag decreases as the pump and fan are retracted, the effects of drag on the airplane 13 are reduced to the fullest extent possible consistent with the pumping requirements. Thus, the fan 17 and the pump 19 may be halted at any one of an infinite number of intermediate positions between the lowermost position of FIGS. 3 and 4 and the fully retracted position of FIG. 2; for example, the intermediate position shown in phantom in FIG. 3. Of course, suitable additional locking devices may be provided on the jointed arm 121 to prevent unintended movement thereof from the selected intermediate position.

Another important feature of this invention is the elastic cord 145 which in effect cancels out a large portion of the weight of the follower means 63, the bracket means 40, the pump 19, and the fan 17, thereby facilitating positioning thereof.

Thus, by carrying the fan and pump of an airborne distribution system within a well in the airplane and lowering them only as required, the drag on the airplane is substantially reduced and the speed and efficiency are substantially increased. The lowering and retraction device 21 also provides a novel means for controlling the output of the pump 19 which also reduces drag to the extent permitted by the pumping requirements.

Electric, fluid operated, or mechanical means may be provided for lowering and retracting the fan 17 and the pump 19 in lieu of the manually operated crank 137. The manual crank 137 is desirable, however, to keep the weight of the aircraft down, to maintain a low initial cost to reduce the cost of maintenance, and because of its simplicity.

Many changes, modifications, and substitutions may be made by one having ordinary skill in the art without departing from the spirit and scope of the invention.

What is claimed is:

1. An airborne system for obtaining a pressurized fluid while maintaining drag at a minimum comprising:
   an airplane having a well opening adjacent a surface thereof;
   pressurizing means substantially completely within said well for pressurizing the fluid;
   wind-driven motor means substantially completely within said well drivingly connected to said pressurizing means, said wind-driven motor means being rotatable to drive said pressurized means to pressurize the fluid;
   means for moving said wind-driven motor means at least partially out of said well into the airstream adjacent said airplane to allow the airstream to drive said motor means; and
   means for utilizing the pressurized fluid.

2. A system as defined in claim 1 further comprising means for providing a plurality of different exposures of said wind-driven motor means to the airstream to thereby provide a plurality of different speeds of said motor means to vary the pressure developed by said pressurizing means.

3. A system for distributing flowable material over a field comprising:
   an airplane having a fuselage with a well opening downwardly;
   a dispersion apparatus secured to said airplane for distributing the flowable material over the field;
   a pump substantially completely within said well for pumping the flowable material through said dispersion apparatus;
   a wind-driven fan substantially completely within said well drivingly connected to said pump;
   means for moving said fan at least partially out of said well into the airstream adjacent said fuselage, to allow the airstream to drive said fan; and
   means for retracting said fan from the airstream to a position substantially completely within the said well to reduce the drag on said airplane.

4. A system as defined in claim 3 wherein said last-mentioned means includes a slide secured to said airplane and extending generally downwardly through said well toward the opening thereof and a follow slidably secured to said slide and connected to said fan.

5. A system for distributing flowable material over a field comprising:
   an airplane having a fuselage with a well opening downwardly;

dispersion apparatus secured to said airplane for distributing the flowable material over the field;

a pump substantially completely within said well for pumping the flowable material through said dispersion apparatus;

a wind-driven fan substantially completely within said well drivingly connected to said pump;

means for lowering said fan and said pump at least partially out of said well into the airstream adjacent said fuselage to allow the airstream to drive said fan; and means for retracting said fan and pump from the airstream to a position substantially completely within said well to reduce drag on said airplane.

6. A system as defined in claim 5 further comprising adjustable means for varying the amount said fan is moved into the airstream to thereby vary the speed of the fan and the pressure developed by said pump.

7. A system for distributing flowable material over a field comprising:

an airplane having a fuselage with a well opening downwardly;

a dispersion apparatus secured to said airplane for distributing the flowable material over the field;

a support rigidly secured to said airplane within said well;

slide means in said well secured to said support and extending downwardly toward the opening of said well and the airstream;

follower means slidably secured to said slide means;

a pump secured to said follower means for pumping the flowable material through said dispersion apparatus;

a wind-driven fan secured to said follower means and drivingly connected to said pump;

means to move said follower means in both directions along said slide to thereby move said fan and said pump into and out of said well and the airstream; and adjustable means for adjusting the amount said fan is moved into the airstream to thereby adjust fan speed and the pressure developed by said pump.

8. A device for moving a wind-driven fan and pump of a distribution system into and out of an open well in the fuselage of an airplane comprising:

supporting means in the well and secured to the airplane;

slide means in the well secured to said supporting means and extending downwardly toward the open end of the well and the airstream;

follower means slidably secured to the slide means at one end and to the wind-driven fan and pump at the other end;

means for moving said follower means in both directions along said slide means to lower the fan and pump into the airstream and to retract the fan and pump from the airstream into the well; and locking means operative when said follower means is closely adjacent its lowermost position for preventing upward forces exerted on said follower means from moving same a substantial distance upward relative to said slide means.

9. A device as defined in claim 8 further including elastic means secured at one end to said follower means and rigidly secured at the other end within the well for exerting an upward force on said follower means, the elastic means facilitating lowering and retraction of the fan and pump.

10. A device as defined in claim 8 wherein said slide means includes at least two spaced substantially parallel rods and said follower means includes at least two collars slidably mounted on said rods.

11. A device as defined in claim 8 wherein said locking means includes a jointed arm pivotally connected at one end to said supporting means and at the other end to said follower means.

12. A device for moving a wind-driven fan and pump of a distribution system between an open well in the fuselage of an airplane and the airstream comprising:

a support in the well and secured to the airplane;

two spaced generally parallel substantially vertical rods mounted on said support and extending downwardly toward the open end of the well and the airstream;

follower means including a bearing mounted on each of said rods and a bracket for mounting the fan and the pump secured to said bearings for movement therewith along said rods;

a jointed arm pivotally connected at one end to said support and at the other end to said follower means;

a rotatable shaft rigidly secured to said one end of said jointed arm, rotation of said shaft rotating said jointed arm to move said follower means along said rods; and an elastic cord secured at one end to said follower means and rigidly secured at the other end to the well for exerting an upward force on said follower means, the elastic cord facilitating raising and lowering of said follower means.

13. A system for attachment to an airplane having a well opening downwardly and adapted to pressurize a fluid to do useful work while maintaining drag at a minimum comprising:

a support in the well;

slide means secured to said support and extending downwardly along said support toward the opening of the well;

follower means slidably secured to said slide means;

pressurizing means for pressurizing the fluid to do useful work and secured to said follower means;

a wind-driven fan drivingly connected to said pressurizing means and secured to said follower means, said wind-driven fan being rotatable to drive said pressuring means to pressurize the fluid; and means for moving said follower means in both directions along said slide means to thereby cause movement of said pressurizing means and said fan into and out of the well.

14. A device for moving a wind-driven fan and pump of a distribution system into and out of an open well in the fuselage of an airplane comprising:

a support in the well and secured to the airplane;

slide means in the well secured to said support and extending downwardly toward the open end of the well and the airstream;

follower means slidably secured to the slide means at one end and to the wind-driven fan and pump at the other end;

means for moving said follower means in both directions along said slide means to lower the fan and pump into the airstream and to retract the fan and pump from the airstream into the well;

locking means operative when said follower means is closely adjacent its lowermost position for preventing upward forces exerted on said follower means from moving same a substantial distance upward relative to said slide means; and means for biasing said follower means upwardly along said slide means.

15. A device for moving a wind-driven fan and pump of a distribution system into and out of an open well in the fuselage of an airplane comprising:

a support in the well and secured to the airplane;

slide means in the well secured to said support and extending downwardly toward the open end of the well and the airstream;

follower means slidably secured to the slide means at one end and to the wind-driven fan and pump at the other end;

means for moving said follower means in both directions along said slide means to lower the fan and pump into the airstream and to retract the fan and pump from the airstream into the well; and means for halting movement of said follower means at least at three different positions along said slide means.

16. An airborne system for distributing flowable material over a field comprising:
- an airplane;
- a dispersion apparatus secured to said airplane for distributing the flowable material over the field;
- a pump secured to said airplane for pumping the flowable material through said dispersion apparatus;
- a wind-driven fan in the airstream adjacent said airplane and secured to said airplane, said wind-driven fan being driven by the airstream and drivingly connected to said pump; and
- means for varying the exposure of said wind-driven fan to the airstream to thereby vary the output of said pump while said airplane is in flight.

References Cited
UNITED STATES PATENTS
3,061,247   10/1962   Hyde _____ 244—136

MILTON BUCHLER, *Primary Examiner.*
B. BELKIN, *Assistant Examiner.*